(12) United States Patent
Fang et al.

(10) Patent No.: US 10,037,491 B1
(45) Date of Patent: Jul. 31, 2018

(54) CONTEXT-BASED SENTIMENT ANALYSIS

(71) Applicant: Medallia, Inc., Palo Alto, CA (US)

(72) Inventors: Ji Fang, Cupertino, CA (US); Andrew Ko, Mountain View, CA (US)

(73) Assignee: Medallia, Inc., San Mateo, CA (US)

( * ) Notice: Subject to any disclaimer, the term of this patent is extended or adjusted under 35 U.S.C. 154(b) by 843 days.

(21) Appl. No.: 14/335,750

(22) Filed: Jul. 18, 2014

(51) Int. Cl.
*G06F 15/18* (2006.01)
*G06N 5/04* (2006.01)
*G06F 17/24* (2006.01)
*G06N 99/00* (2010.01)

(52) U.S. Cl.
CPC ............ *G06N 5/04* (2013.01); *G06F 17/241* (2013.01); *G06N 99/005* (2013.01)

(58) Field of Classification Search
CPC ....... G06N 5/04; G06N 99/005; G06F 17/241
USPC .............................. 706/15, 20, 45
See application file for complete search history.

(56) References Cited

U.S. PATENT DOCUMENTS

| | | | | |
|---|---|---|---|---|
| 9,129,008 B1 * | 9/2015 | Kuznetsov | ........ | G06F 17/30038 |
| 2010/0121857 A1 * | 5/2010 | Elmore | ............. | G06F 17/30702 707/748 |
| 2013/0325877 A1 * | 12/2013 | Niazi | ................. | G06Q 30/0203 707/748 |
| 2015/0286953 A1 * | 10/2015 | Papadopoullos | ... | G06F 17/2785 706/12 |

OTHER PUBLICATIONS

Recognizing Contextual Polarity in Phrase-Level Sentiment Analysis, by Wilson , published 2005.*
QA with Attitude: Exploiting Opinion Type Analysis for Improving Question Answering in On-line Discussions and the News, by Somasundaran, published 2007.*
Real Time Sentiment Classification Using Unsupervised Reviews, by Divya, published Mar. 2014.*
Michael Gamon. "Sentiment classification on customer feedback data: noisy data, large feature vectors, and the role of linguistic analysis." Proceedings of the 20th international conference on Computational Linguistics. Association for Computational Linguistics, 2004.
Bing Liu. Web data mining. Springer-Verlag Berlin Heidelberg, 2007.
Pang et al. "Thumbs up?: sentiment classification using machine learning techniques." Proceedings of the ACL-02 conference on Empirical methods in natural language processing—vol. 10. Association for Computational Linguistics, 2002.
Zhou et al. "Ontology—supported polarity mining." Journal of the American Society for Information Science and technology 59.1 (2008): 98-110.

* cited by examiner

*Primary Examiner* — David R Vincent
(74) *Attorney, Agent, or Firm* — Van Pelt, Yi & James LLP (57) ABSTRACT

Context-based sentiment analysis includes: determining whether a piece of comment data included in a comment is context-sensitive, the determination being made with reference to a set of comment features; determining a context sentiment type of an associated context related to the piece of comment data, the associated context being distinct from the comment, in the event that the piece of comment data is determined to be context-sensitive, and the determination being made with reference to at least a set of context features; and classifying the comment data in the event that the piece of comment data is determined to be context-sensitive, the classification being based at least in part on the comment data and the context sentiment type.

19 Claims, 6 Drawing Sheets

CONTEXT-BASED SENTIMENT ANALYSIS

BACKGROUND

Sentiment analysis refers to the processing and analysis of source materials to extract subjective information such as the attitudes or opinions of the authors of the source materials. Existing sentiment analysis techniques use only the source materials as the basis for determining sentiments and can often lead to errors.

Some existing techniques use a dictionary-based approach in which certain words are classified (e.g., labeled) to indicate positive or negative sentiments, and sentences including these words take on the same sentiment as the words. For example, the word "long" may be deemed to be positive in the dictionary. In practice, however, the word "long" may reflect different sentiments of the author depending on the topic discussed in the same text in which the word "long" is used. For instance, "the battery life is long" indicates a positive sentiment, but "the check-in line is long" indicates a negative sentiment. As another example, the same answer to different questions can indicate different sentiments. The answers in response to the questions of "What compliments do you have for our staff?" and "What could we have done to improve?" are both "Housekeeping." In response to the first question, the answer indicates a positive sentiment; in response to the second question, however, the same answer indicates a negative sentiment. Existing sentiment analysis techniques often misidentify the sentiments in such cases.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Context-based sentiment analysis is disclosed. In some embodiments, the sentiment analysis is performed on a system comprising: a context-sensitive comment data detector that determines whether comment data included in a comment is context-sensitive; a context sentiment type classifier that determines a context sentiment type of a context related to the comment data in the event that the comment data is determined to be context-sensitive; and a comment classifier that classifies the comment data based on the context sentiment type in the event that the comment data is determined to be context-sensitive. In some embodiments, machine learning techniques are used to implement the context-sensitive comment data detector, the context sentiment type classifier, and/or the comment classifier.

Figure 1:
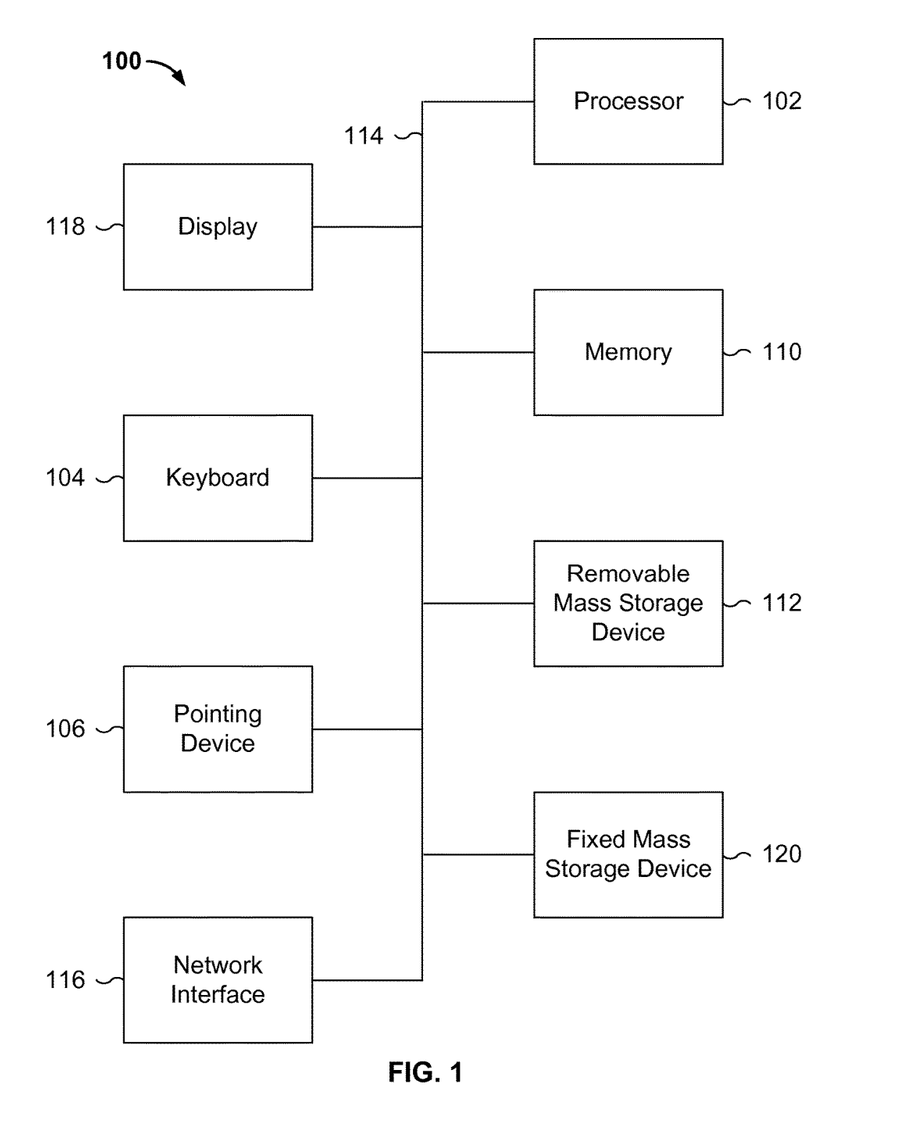
FIG. 1 is a functional diagram illustrating a programmed computer system for executing context analysis in accordance with some embodiments.

FIG. 1 is a functional diagram illustrating a programmed computer system for executing context analysis in accordance with some embodiments. As will be apparent, other computer system architectures and configurations can be used to perform one or more functions during a context analysis process. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide one or more of components 202-210 described below.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2A:
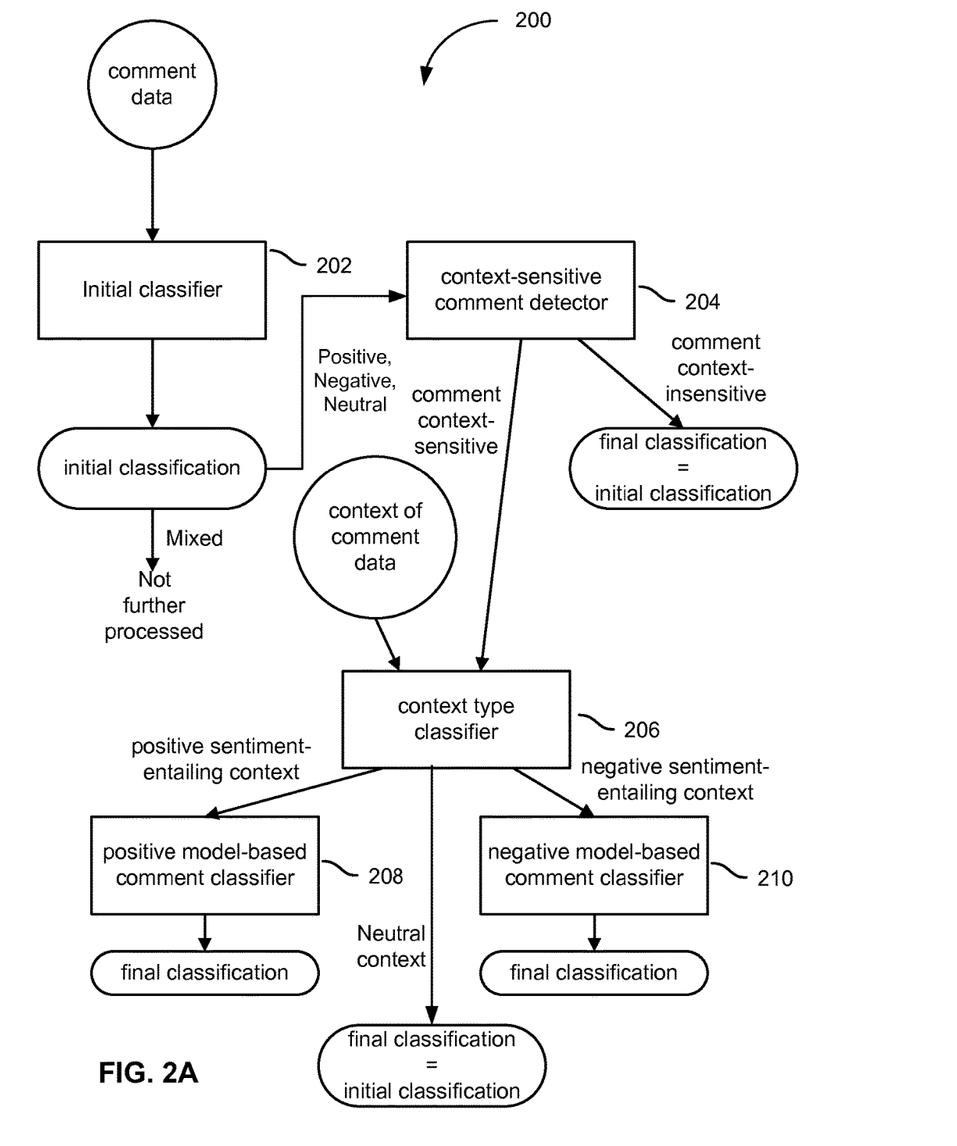
FIG. 2A is a block diagram illustrating an embodiment of a system for context-based sentiment analysis.

FIG. 2A is a block diagram illustrating an embodiment of a system for context-based sentiment analysis.

In this example, context-sensitive comment analyzer 200 includes an optional initial classifier 202, a context-sensitive comment data detector 204, a context type classifier 206, and a comment classifier comprising a positive model-based comment classifier 208 and a negative model-based comment classifier 210. Details of the components are described below. The components described herein can be implemented as software components executing on one or more computer processors, as hardware such as programmable logic devices and/or Application Specific Integrated Circuits designed to perform certain functions, or a combination thereof. In some embodiments, the components can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The components may be implemented on a single device or distributed across multiple devices. The functions of the components may be merged into one another or further split into multiple sub-components.

As will be described in greater detail below, in some embodiments, components such as context-sensitive comment data detector 204, context type classifier 206, and/or comment classifiers 208 and 210 are implemented based on machine learning techniques.

Figure 3A:
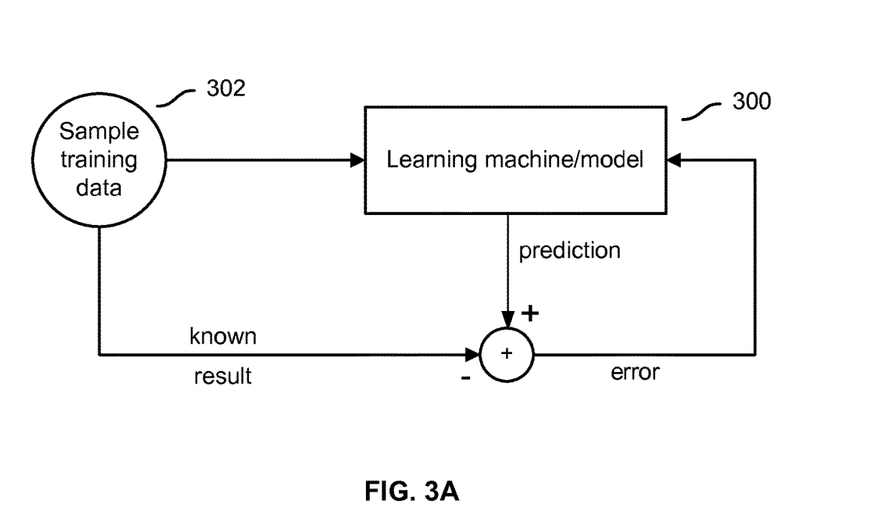
FIGS. 3A-3B are block diagrams illustrating a learning machine.
Figure 3B:
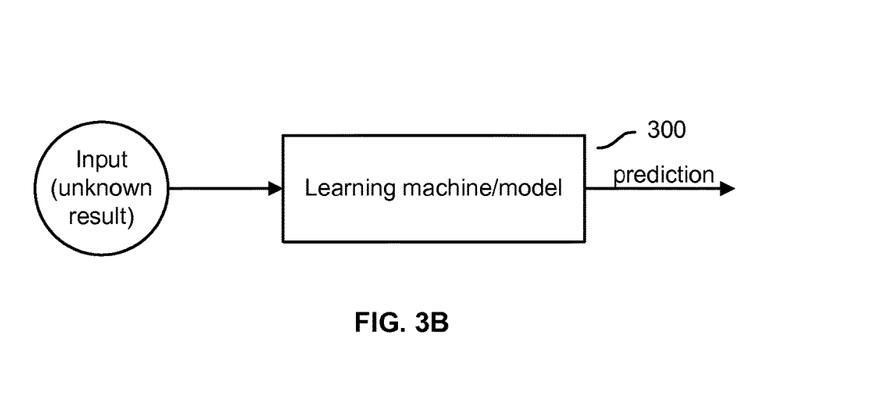

FIGS. 3A-3B are block diagrams illustrating a learning machine. In FIG. 3A, a set of sample training data 302 is input into a learning machine 300 during a training process. Each piece of training data has a known input (e.g., an input vector) and a known result (also referred to as an output) associated with the input. In some embodiments, the sample training data is generated manually. For example, an input can be a set of features extracted from a piece of comment data, and the result can be a manually determined classification (also referred to as a label) of whether the set of comment features is context-sensitive in terms of the sentiment revealed by the comment data. As another example, the input can be a set of features extracted from a piece of comment data, and the result corresponds to whether the comment data indicates a positive sentiment. As another example, an input can be a set of features extracted from an individual context, and the result can be a manually determined label of whether the context is positive sentiment-entailing or negative sentiment-entailing. The learning machine can be implemented using a decision tree, a neural network, a Bayesian classifier, a support vector machine (SVM), or any other appropriate machine learning methods. The learning technique analyzes the training data and generates an inferred function that models the input-output (result) relationship for the training data. Open source libraries and tools such as libsvm and weka can be used to implement such learning technique. In other words, a model (the function inferred from the training data) is used to make a prediction (e.g., a classification) of the output result given an input. In some cases, the predicted outputs generated by the model are compared with the actual outputs of the samples to determine the prediction errors. The prediction errors are fed back to the model to adapt the model. For example, the coefficients or parameters of the model may be adjusted. The training data (or a portion of the training data) is input to the adapted model, and errors of the model are measured again. Adaptation changes to the model that improve the prediction (e.g., resulting in smaller error rate or magnitude) are accepted. The adaptation process may repeat until an acceptable prediction error rate is reached. After training, in FIG. 3B, a new input with no known output is sent to learned model 300, which will generate a predicted output.

Figure 2B:
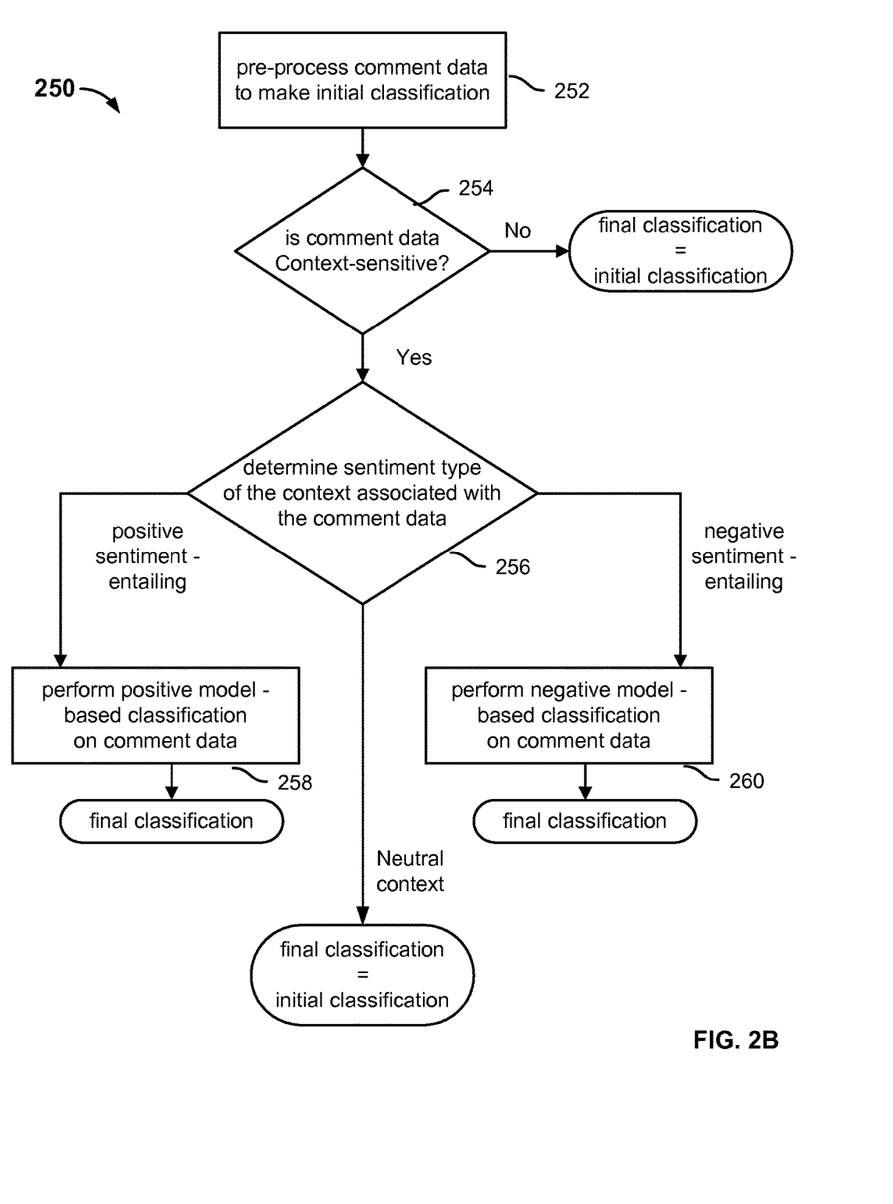
FIG. 2B is a flowchart illustrating an embodiment of a context-based sentiment analysis process.

FIG. 2B is a flowchart illustrating an embodiment of a context-based sentiment analysis process. Process 250 can be implemented on a system such as 100 or 200.

In some embodiments, a comment is preprocessed and divided into multiple pieces. Process 200 analyzes an individual piece of comment data. For example, in some embodiments, each sentence in a multi-sentence comment is a separate piece of data to be analyzed. Other ways of processing data can be used, such as grouping several individual sentences to form a piece of comment data, further segmenting a sentence into multiple pieces of subclauses and/or phrases, etc.

At 252, a piece of comment data is initially classified using a conventional sentiment analysis technique such as SVM classification. Referring to FIG. 2A, an initial classifier 202 pre-classifies a piece of comment data.

In some embodiments, the initial classification is performed using a conventional sentiment analyzer that makes an initial assessment of the sentiment associated with the piece of comment data. The conventional sentiment analyzer can include a static analyzer employing a standard model that is based on the text of the comment data only. The implementation of such a conventional sentiment analyzer is known to those skilled in the art. Initial Classifier 202 makes an initial determination of the sentiment of the piece of comment data as positive, negative, neutral, or mixed. For example, in an example standard model, if a sentence has certain words such as "excellent," it is deemed to indicate a positive sentiment; if the sentence has certain words such as "poor," it is deemed to indicate a negative sentiment; and if the sentence has certain words such as "average," it is deemed to indicate a neutral sentiment. Moreover, a sentence that includes both "excellent" and "poor" (e.g., "The food was excellent but the service was poor.") is deemed to indicate a mixed sentiment. In this example, a piece of comment data identified as positive, negative, or neutral is further processed. Specifically, the context of that data is identified by the context-sensitive comment data detector 204. A piece of comment data that is identified as mixed is not further processed and its final sentiment classification is mixed.

Returning to FIG. 2B, at 254, it is determined whether the comment data is context-sensitive. The determination is made with reference to a set of comment features extracted from the comment data.

Referring again to FIG. 2A, context-sensitive comment data detector 204 determines whether the piece of comment data is context-sensitive with reference to a set of comment features extracted from the comment data.

In some embodiments, a set of comment features pertaining to context sensitivity of comment data is predetermined, and rules are established based on the comment features to indicate whether a particular piece of comment data that has the comment feature is context-sensitive. These comment features and rules can be identified based on empirical observations, machine learning techniques such as supervised learning, or a combination of these techniques.

Examples of the comment features and their corresponding rules specifying whether the comment data is context-sensitive given the comment features include:

1. Subject. If there is a subject in the comment data, the comment data is context-insensitive. This is because a sentence that includes a subject tends to express a complete thought and therefore more likely to be context-insensitive.

2. Length. If the length of the comment data exceeds a certain threshold, the comment data is deemed to be context-insensitive. For example, a sentence that has more than fifteen words tends to express a complete thought and is more likely context-insensitive.

3. Verb. If the comment data includes a verb not in a sentence-initial position, the comment data is deemed to be context-insensitive.

4. Proper nouns (person names, location names etc.). If a sentence consists of only proper nouns, it is deemed to be context-sensitive.

5. Imperative. If the comment data includes a word or phrase in the imperative mood, the comment data is deemed to be context-sensitive.

6. First word. If the first word in the comment data is not a noun or pronoun, the comment data is deemed to be context-sensitive.

7. Comparative adverb or adjective. If the comment data includes a comparative adverb or adjective, the comment data is deemed to be context-sensitive. For example, a sentence that includes a comparative adverb or adjective such as "better" or "slower" is deemed to be context-sensitive.

Many other or additional features can be used. In some embodiments, a combination of factors forms a comment feature. For example, a sentence that includes a verb not in a sentence-initial position and has a length of fifteen words or more is deemed to be context-insensitive, but a sentence that includes a verb not in a sentence-initial position and includes a comparative adjective or adverb deemed to be context-sensitive.

In some embodiments, the detector is implemented by testing the features of the comment data against the rules. For example, the rules are checked one by one, until it is determined that the comment data is context-sensitive, or until all the rules are checked and the comment data is found to be context-insensitive.

In some embodiments, the detector is implemented using a machine learning technique similar to what was discussed in FIGS. 3A-3B. The comment features can be determined empirically based on observation, using statistical techniques, or a combination. In some embodiments, the training data includes comment feature values extracted from sample comment data that is known to be context-sensitive or context-insensitive (e.g., manually classified), and the training data is applied to generate and adapt the model. Examples of the model include a decision tree, a neural network, a Bayesian classifier, a support vector machine (SVM), or any other appropriate machine learning models. During the adaptation process, for each input, a prediction is made using the initial model. The predicted result is compared with the actual known classification of the input. Adaptation includes adjusting the coefficients and/or other parameters of the model to improve predictions for the training data. After training, detector 204 is configured to extract, from comment data whose context sensitivity is unknown, the values of the comment features, and make a classification according to rules such as those described above.

Returning to FIG. 2B, in process 250, a piece of context-insensitive comment data is not further processed, and the initial classification made by the initial classifier becomes the final classification associated with this piece of comment data. If the comment data is context-sensitive, at 256, a sentiment type of the context associated with the comment data is determined. Unlike static analysis where the comment itself is analyzed, in this example, the context associated with the comment data is distinct from the comment data itself. The determination is made with reference to a set of predetermined context features such as keywords or key phrases.

In some embodiments, the context is distinct from the comment being analyzed. For example, the context can include the text of a question (e.g., a survey question) made by a first user (e.g., a surveyor) and the comment can include the answer supplied by a second user (e.g., a respondent) in response to the question. For example, in response to the question of "What improvements would you like to see on your next visit?" a survey respondent supplies the answer "faster service." The text of the question is the context in this example. In some embodiments, the context includes the text of a topic that is introduced on a blog, a social networking site, or a website, and the comment includes the text of the follow up postings that are made in response. For example, on a restaurant's website, a request is posted stating "Please send us your ideas for improvements," and website users can send in comments such as "shorter delivery time," "better online order forms," etc., in response. The text of the initial request is the context in this example. As another example, the restaurant may post on their Facebook® page the same posting, and Facebook® users can make comments in response. The text of such postings is the context in these examples.

The sentiment type of the context of a comment can be classified as positive sentiment-entailing, negative sentiment-entailing, or neutral depending on whether the context tends to invoke comments with positive sentiments, negative sentiments, or any kind of sentiments, respectively. For example, a question such as "What improvements would you like to see?" is negative sentiment-entailing since the answers pertain to shortcomings of existing services; in contrast, a question such as "What compliments do you have for our staff?" is positive sentiment-entailing since the answers tend to be the things with which the respondent is satisfied. A question or request such as "Any comments you would like to share?" can invoke comments with any sentiment, and such context is neutral. If the context is neutral, the piece of comment data is not further processed, and the initial classification made by the initial classifier becomes the final classification associated with this piece of comment data.

Referring again to FIG. 2A, in the event that the comment data is deemed to be context-sensitive, context type classifier 206 determines whether the piece of comment data is associated with a positive sentiment-entailing context, a negative sentiment-entailing context, or a neutral context.

In various embodiments, context type classifier 206 can be implemented based on manual classification, a machine learning method, or a combination.

Figure 4A:
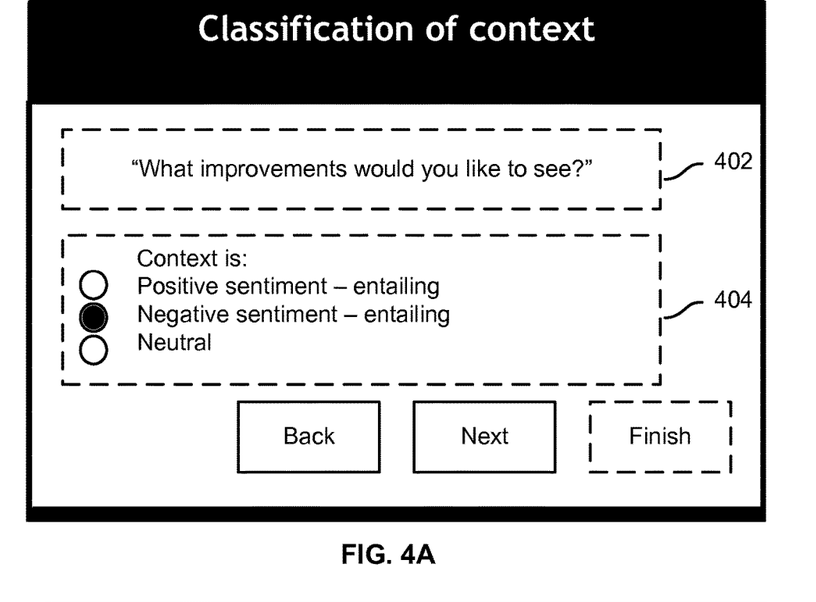
FIGS. 4A-4B are embodiments of user interface screens of a context configuration tool.
Figure 4B:
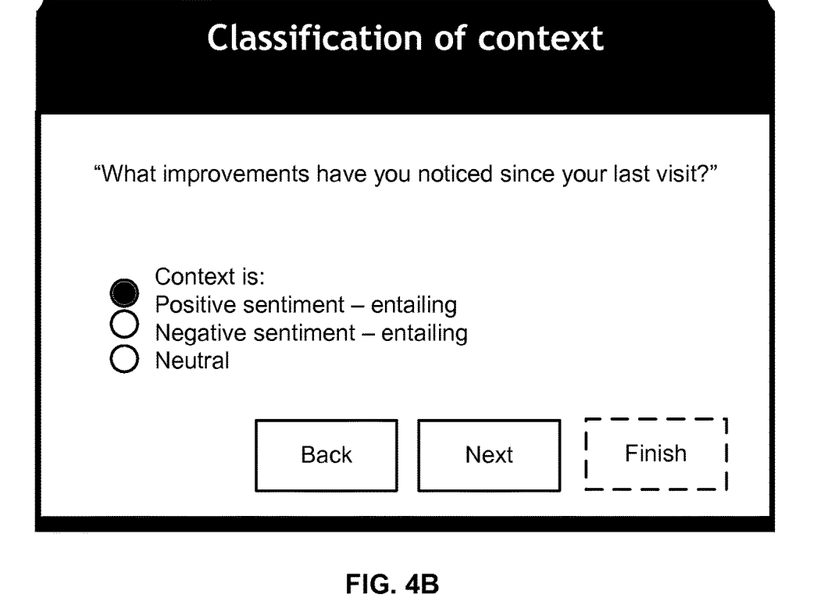

In some embodiments of a manual classification scheme, an administrator-user manually labels each context as positive sentiment-entailing, negative sentiment-entailing, or neutral and stores them in a database. In some embodiments, a context configuration tool is provided to an administrator-user who creates or reviews the survey questions, website/social media platform postings, or other context data for manual classification. FIGS. 4A-4B are embodiments of user interface screens of a context configuration tool. In this example, the text of a survey question or website posting is shown in area 402, and a user interface widget 404 (shown as radio buttons in this example, but can also be selection boxes, drop down menus, etc.) is provided for the administrator-user to manually classify the context type based on his own judgment. In some embodiments, a code or other label identifies whether a context is positive sentiment-entailing, negative sentiment-entailing, or neutral (e.g., 1 for positive, 2 for negative and 3 for neutral). When the administrator-user completes the classification (e.g., when he clicks on "next" or "finish" as appropriate), the context information and the corresponding classification information is recorded and stored (e.g., in a table, a database, or the like). In some embodiments, whether the context is positive sentiment-entailing or negative sentiment-entailing is encoded. For example, the data may be formatted as "what improvements would you like to see, 2" to indicate that the corresponding context is negative sentiment-entailing, and "what improvements have you noticed since your last visit, 1" to indicate that the corresponding context is positive sentiment-entailing. Other formats are permitted. For example, the context sentiment type mapping may be stored using identifiers (e.g., serial numbers, checksums, or hash values of the text, etc.) rather than using plain text.

In some embodiments, the manually classified contexts such as questions/postings/topics are stored in a library and selected for applications requiring such questions/postings/topics (e.g., a survey website, a Facebook® posting, etc.). These existing contexts are displayed to various respondent-users to collect comments. During sentiment analysis process 200, when the context type of a context-sensitive comment made in response to a classified context needs to be identified, the context associated with the comment is looked up in the storage. The corresponding entry includes the sentiment type label, which the classifier uses as a result of the classification. For example, if the context includes the question of "What improvements would you like to see?" the lookup result will indicate that the question has been labeled as negative sentiment-entailing.

In some embodiments, a context such as a question/posting/topic may not be manually classified ahead of time, and new context can be generated and used. Classifier 206 is implemented using a machine learning technique similar to what is described in FIGS. 3A-3B. A training set of manually labeled sample data (e.g., a set of sample survey questions manually classified using a context configuration tool described above) is used to train a learning machine model such as an SVM, a Bayesian classifier, a decision tree, etc. The inputs of the training set are features of the context information, and the outputs are the known classifications of the context (i.e., whether the context is positive sentiment-entailing, negative sentiment-entailing or neutral). The adaptation process is performed to train the learning machine model. The features can include various textual queues such as keywords or key phrases used in the question or topic. In some embodiments, a dictionary of keywords or key phrases that map individual entries to either a positive sentiment-entailing type or a negative sentiment-entailing type is pre-established, and N-gram analysis is used to extract the keywords or key phrases from the context. The extracted keywords or key phrases are looked up in the dictionary and scored (e.g., based on counts of these two types) to determine whether the context is positive sentiment-entailing or negative sentiment-entailing.

After classifier 206 is trained, when the context type of a context associated with a context-sensitive comment needs to be identified, and the context information is new (i.e., was not previously classified and stored), the context information is input into classifier 206, which applies the trained model to process the context information and generate a classification.

Returning to FIG. 2B, in process 250, if the context of the comment data is deemed to be positive sentiment-entailing, then a positive context model-based comment classification is used to make a final classification of the comment at 258; if the context of the comment data is deemed to be negative sentiment-entailing, then a negative context model-based comment classification is used to make a final classification of the comment at 260; if the context is deemed to be neutral, then the final classification is the same as the initial classification made by the comment detector.

Referring again to FIG. 2A, a positive model-based comment classifier 208 or a negative model-based comment classifier 210 is used to make a final classification of the comment data depending on whether the associated context is positive sentiment-entailing or negative sentiment-entailing, respectively. If the context is neutral, the final classification is the same as the initial classification.

Figure 5A:
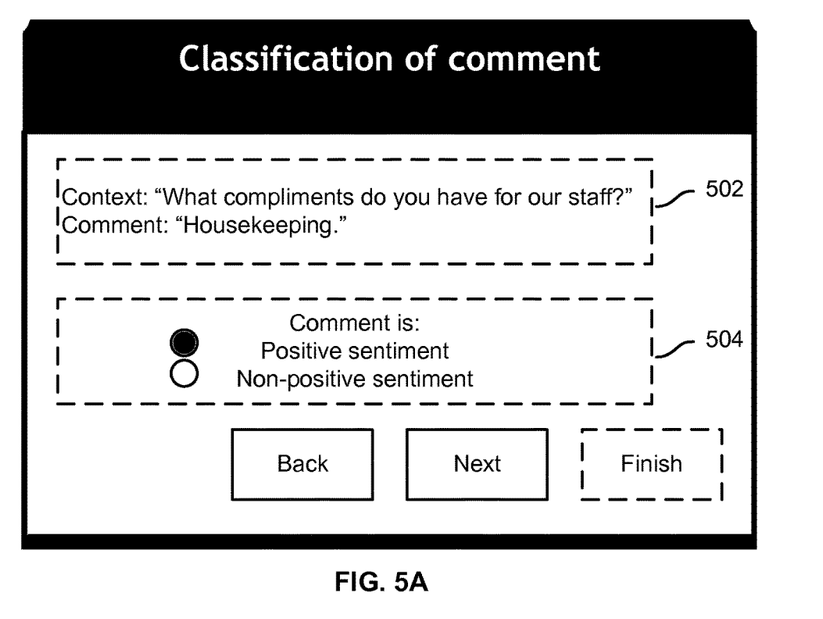
FIGS. 5A and 5B are embodiments of user interface screens of a comment configuration tool.
Figure 5B:
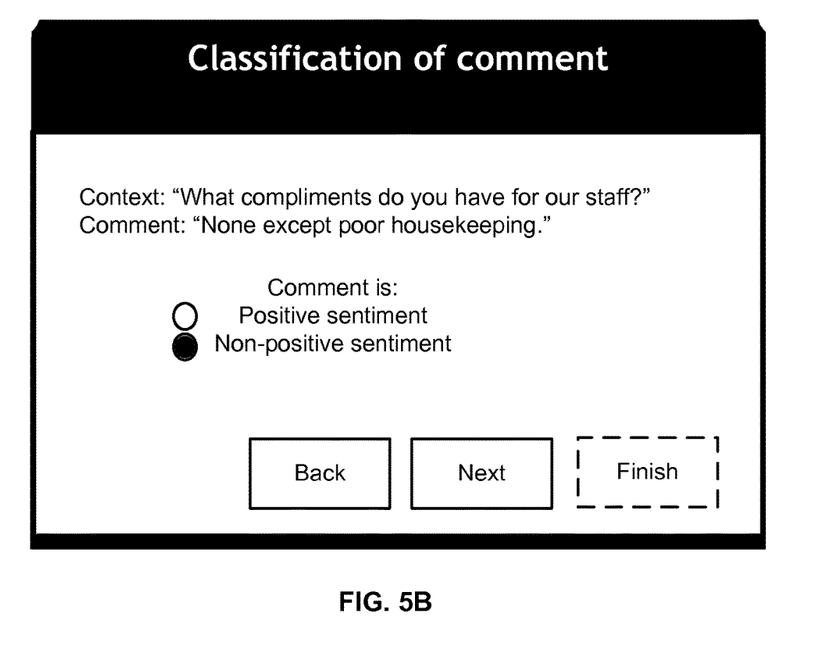

In some embodiments, comment classifiers 208 and 210 are both implemented using machine learning techniques such as those discussed in connection with FIGS. 3A-3B. To implement the positive model-based classifier, a set of training data (e.g., comment features) of sample comment data known to be associated with positive sentiment-entailing contexts is manually classified as actually revealing a positive sentiment or a non-positive (negative or neutral) sentiment. In some embodiments, a comment configuration tool is provided to an administrator-user to classify the comments. FIGS. 5A and 5B are embodiments of user interface screens of a comment configuration tool. The context and the comment data made in response to the context is shown in area 502, and a user interface widget 504 (shown as radio buttons in this example, but can also be selection boxes, drop down menus, etc.) is provided for the administrator-user to manually classify the content as a positive sentiment or non-positive sentiment. In the example of FIG. 5A, the comment data sample "Housekeeping" is known to be associated with a positive sentiment-entailing context (in this case, the question of "What compliments do you have for our staff?") and deemed by the administrator-user as revealing a positive sentiment. In the example of FIG. 5B, another comment data sample "None except poor housekeeping" is known to be associated with the same question/context, and deemed by the administrator-user as revealing a non-positive sentiment. Many other training data can be generated and classified. Features of the comment data samples are extracted as sets of inputs. The inputs and classifications form the training data.

The training data is fed into the model to adjust the parameters of the model. The resulting model will predict, for a new input that is determined to be associated with a positive sentiment-entailing context, whether the input is deemed to be positive or not. Note that the input comment data is associated with an initial classification of positive, negative, or neutral.

In this example, the positive model-based classifier behaves as follows:

If the initial classification is neutral or negative, but the prediction produced by the positive model is positive, the final classification of the input comment data will be positive. For example, "Housekeeping" would be initially classified as "neutral", but if its question context is "What compliments do you have for our staff", this sentence will go through a positive model. If the prediction produced by the positive model is "positive", "positive" will become its final classification label.

If the initial classification is neutral or negative, and the prediction produced by the positive model is not-positive, the initial classification of the input comment data remains.

If the initial classification is positive, and the prediction produced by the positive model is positive, the final classification of the input comment data is positive.

If the initial classification is positive, but the prediction produced by the positive model is not-positive, the final classification of the input comment data is neutral.

Different behaviors of the positive model-based classifier can be configured in other embodiments.

Similarly, to implement the negative model-based classifier, a set of sample training data such as comment features of comment data known to be associated with a negative sentiment-entailing context is manually classified as actually revealing a negative sentiment or a non-negative (positive or neutral) sentiment. For example, features of the comment data "Housekeeping," which is associated with a negative sentiment-entailing context (e.g., the question of "What improvements would you like to see?") and deemed to reveal a negative sentiment, can be used as training data. Many other training data can be generated. The training data is fed into the model to adjust the parameters of the model. The resulting model will predict, for a new input that is determined to be associated with a negative sentiment-entailing context, whether the input is deemed to be negative or not. The input comment data is also associated with a preliminary classification of positive, negative, or neutral as a result of the preprocessing.

In this example, the negative model-based classifier behaves as follows:

If the input comment data is positive or neutral, but the prediction of the negative model-based classifier is negative, then the final classification will switch the classification of the input comment data to negative.

If the input comment data is positive or neutral, and the prediction of the negative model-based classifier indicates that the final classification is not negative, then the classification of the input comment data remains.

If the input comment data is negative and the prediction is also negative, then the final classification of the input comment data is negative and the classification of the input comment data is unchanged.

If the input is negative but the prediction made by the negative model-based classifier is not negative, the model will switch the classification of the input comment data to neutral.

Different behaviors of the positive model-based classifier can be configured in other embodiments.

Context-based sentiment analysis has been described. The multi-step analysis technique takes into account the context in response to which a comment is made and more accurately classifies the sentiment associated with the comment data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for context-based sentiment analysis, comprising:
    one or more processors configured to:
        obtain a piece of comment data that is initially determined to be associated with a positive sentiment, a negative sentiment, a neutral sentiment, or a mixed sentiment, the piece of comment data being included in a comment;
        determine a context sentiment type of an associated context related to the piece of comment data, the associated context being distinct from the comment and including text that is created at a different time than the piece of comment data, and the determination being made with reference to at least a set of context features, wherein the context sentiment type indicates that the associated context is positive sentiment-entailing, negative sentiment-entailing, or neutral, wherein the determining of the context sentiment type of the associated context related to the piece of comment data comprises to:
            determine whether the context sentiment type of the associated context related to the piece of comment data is positive sentiment-entailing; and
            in response to a determination that the context sentiment type is determined to be positive sentiment-entailing, classify the piece of comment data includes using a positive model-based comment classifier, comprising to:
                perform an initial classification; and
                in response to a determination that the initial classification is positive and a positive context model-based comment classification of the positive model-based comment classifier is not-positive, determine a final classification to be neutral; and
        classify the piece of comment data, the classification being based at least in part on the piece of comment data and the context sentiment type; and
    one or more memories coupled to the one or more processors, configured to provide the one or more processors with instructions.

2. The system of claim 1, wherein the associated context is supplied by a first user, and the comment is supplied by a second user distinct from the first user.

3. The system of claim 1, wherein the associated context includes a question or topic, and the comment is made in response to the associated context.

4. The system of claim 1, wherein the set of context features includes a keyword or key phrase.

5. The system of claim 1, wherein the positive model-based comment classifier is trained using training data comprising sample comment data known to be associated with positive sentiment-entailing contexts.

6. The system of claim 1, wherein to classify the piece of comment data includes to use a negative model-based comment classifier in the event that the context sentiment type is determined to be negative sentiment-entailing.

7. The system of claim 6, wherein the negative model-based comment classifier is trained using training data comprising sample comment data known to be associated with negative sentiment-entailing contexts.

8. A method for context-based sentiment analysis, comprising:
    obtaining a piece of comment data that is initially determined to be associated with a positive sentiment, a negative sentiment, a neutral sentiment, or a mixed sentiment, the piece of comment data being included in a comment;
    determining a context sentiment type of an associated context related to the piece of comment data, the associated context being distinct from the comment and including text that is created at a different time than the piece of comment data, and the determination being made with reference to at least a set of context features, wherein the context sentiment type indicates that the associated context is positive sentiment-entailing, negative sentiment-entailing, or neutral, wherein the determining of the context sentiment type of the associated context related to the piece of comment data comprises:
        determining whether the context sentiment type of the associated context related to the piece of comment data is positive sentiment-entailing; and
        in response to a determination that the context sentiment type is determined to be positive sentiment-entailing, classifying the piece of comment data includes using a positive model-based comment classifier, comprising to:
            performing an initial classification; and
            in response to a determination that the initial classification is positive and a positive context model-based comment classification of the positive model-based comment classifier is not-positive, determining a final classification to be neutral; and
    classifying the piece of comment data, the classification being based at least in part on the piece of comment data and the context sentiment type.

9. The method of claim 8, wherein the associated context is supplied by a first user, and the comment is supplied by a second user distinct from the first user.

10. The method of claim 8, wherein the associated context includes a question or topic, and the comment is made in response to the associated context.

11. The method of claim 8, wherein the set of context features includes a keyword or key phrase.

12. The method of claim 8, further comprising training a positive model-based classifier using training data comprising sample comment data known to be associated with positive sentiment-entailing contexts.

13. The method of claim 8, further comprising performing a negative model-based comment classification in the event that the context sentiment type is determined to be negative sentiment-entailing.

14. The method of claim 13, further comprising training a negative model-based classifier using training data comprising sample comment data known to be associated with negative sentiment-entailing contexts.

15. A computer program product for context-based sentiment analysis, the computer program product being embodied in a tangible computer readable storage medium and comprising computer instructions for:

obtaining a piece of comment data that is initially determined to be associated with a positive sentiment, a negative sentiment, a neutral sentiment, or a mixed sentiment, the piece of comment data being included in a comment;

determining a context sentiment type of an associated context related to the piece of comment data, the associated context being distinct from the comment and including text that is created at a different time than the piece of comment data, and the determination being made with reference to at least a set of context features, wherein the context sentiment type indicates that the associated context is positive sentiment-entailing, negative sentiment-entailing, or neutral, wherein the determining of the context sentiment type of the associated context related to the piece of comment data comprises:

determining whether the context sentiment type of the associated context related to the piece of comment data is positive sentiment-entailing; and in response to a determination that the context sentiment type is determined to be positive sentiment-entailing classifying the piece of comment data includes using a positive model-based comment classifier, comprising to:

performing an initial classification; and in response to a determination that the initial classification is positive and a positive context model-based comment classification of the positive model-based comment classifier is not-positive, determining a final classification to be neutral; and classifying the piece of comment data, the classification being based at least in part on the piece of comment data and the context sentiment type.

16. The system of claim 1, wherein to determine a context sentiment type includes using a learning machine that is trained using sample context known to be positive sentiment-entailing, negative sentiment-entailing, or neutral.

17. The system of claim 16, wherein the learning machine includes a decision tree, a neural network, a Bayesian classifier, or a support vector machine.

18. The method of claim 8, wherein determining a context sentiment type includes using a learning machine that is trained using sample context known to be positive sentiment-entailing, negative sentiment-entailing, or neutral.

19. The method of claim 18, wherein the learning machine includes a decision tree, a neural network, a Bayesian classifier, or a support vector machine.

* * * * *